(12) United States Patent
Patterson et al.

(10) Patent No.: US 6,996,711 B2
(45) Date of Patent: Feb. 7, 2006

(54) CERTIFICATION VALIDATION SYSTEM

(75) Inventors: Andrew John Patterson, Chatham (GB); Hilton Day, London (GB); Nicola Cameron, London (GB)

(73) Assignee: Sun Microsystems, Inc., Santa Clara, CA (US)

( * ) Notice: Subject to any disclaimer, the term of this patent is extended or adjusted under 35 U.S.C. 154(b) by 962 days.

(21) Appl. No.: 09/796,940

(22) Filed: Feb. 28, 2001

(65) Prior Publication Data

US 2002/0053023 A1 May 2, 2002

(30) Foreign Application Priority Data

Aug. 17, 2000 (GB) .................................... 0020336

(51) Int. Cl.
*H04L 9/30* (2006.01)

(52) U.S. Cl. ...................... 713/156; 713/155; 713/158; 380/279; 380/282

(58) Field of Classification Search ................ 713/156, 713/155, 158, 157; 380/279, 282; 709/248
See application file for complete search history.

(56) References Cited

U.S. PATENT DOCUMENTS

| | | | |
|---|---|---|---|
| 5,889,952 A | | 3/1999 | Hunnicutt et al. |
| 5,941,947 A | | 8/1999 | Brown et al. |
| 5,958,050 A | * | 9/1999 | Griffin et al. ................ 713/200 |
| 6,055,236 A | | 4/2000 | Nessett et al. |
| 6,061,448 A | * | 5/2000 | Smith et al. ................. 380/282 |
| 6,247,127 B1 | * | 6/2001 | Vandergeest ................ 713/100 |
| 6,301,658 B1 | * | 10/2001 | Koehler ....................... 713/155 |
| 6,324,645 B1 | * | 11/2001 | Andrews et al. ............. 713/157 |
| 6,351,812 B1 | * | 2/2002 | Datar et al. .................. 713/182 |

FOREIGN PATENT DOCUMENTS

| | | |
|---|---|---|
| EP | 0580350 | 7/1993 |
| EP | 0717339 | 12/1995 |
| WO | WO 99/61989 | 12/1999 |
| WO | WO 00/31944 | 6/2000 |

OTHER PUBLICATIONS

Courter, et al., Mastering Microsoft Office 2000 Professional Edition, Sybex, 1999, pp. 466-467.*

(Continued)

*Primary Examiner*—Gilberto Barron, Jr.
*Assistant Examiner*—Daniel M. Ungar
(74) *Attorney, Agent, or Firm*—Meyertons Hood Kivlin Kowert & Goetzel, P.C.; B. Noël Kivlin

(57) ABSTRACT

A certificate validation mechanism is provided for a network interface. The certificate validation mechanism maintains a certificate cache containing local copies of certificates with associated validity indications. The certificate validation mechanism is operable to compare a certificate associated with a received message to the certificate cache and, where the certificate associated with the received message is held in the certificate cache, to associate with the message an indication of validity retrieved from the certificate cache. By providing a cache for certificates local to the network interface, the need always to verify a certificate by reference to a public repository is removed. If a certificate is not held in the local cache, then it can still be necessary to query the public repository. Nevertheless, the verification mechanism provides more immediate verification of certificate validity as this can be made locally without the cost and time of the remote verification at the public repository. The verification mechanism can form part of portal for a network interface.

22 Claims, 8 Drawing Sheets

OTHER PUBLICATIONS

International Search Report for Application No. GB 0020336.4 dated Nov. 28, 2001.

"Authentication Mechanisms in Microprocessor-Based Local Area Networks", Ciminiera, et al, Software Engineering, *IEEE Transactions*, May 1989, vol. 15, Issue 5, pp. 654-658.v.

European Search Report for Application No. EP 01 30 5686 dated Aug. 13, 2003.

* cited by examiner

| USER ID | CERTIFICATE | VALIDITY | DATE / TIME |
|---|---|---|---|
|  |  |  |  |
|  |  |  |  |

| SENDER ID | CERTIFICATE | VALIDITY | DATE / TIME |
|---|---|---|---|
|  |  |  |  |
|  |  |  |  |

CERTIFICATION VALIDATION SYSTEM

BACKGROUND OF THE INVENTION

This invention relates to secure messaging, and in particular to the confirming the validity of a certificate associated with a message sent over a network.

In recent years, the use of electronic communication has expanded at a tremendous rate. There is a growing use of electronic communication for transactions of many different types, including, for example, financial transactions. Many of these transactions require the use of verifiable means of identification. For example, if a transaction is to be conducted in a purely electronic manner, the parties to the transactions need to ensure that the other parties to the transaction are who they purport to be.

Approaches to the verification of identity have been developed that involve the use of signed messages, and the passing of digital certificates. A digital certificate is issued to a user once the user's identity has been verified. The certificate is based on trust, with the value of the trust being passed down a hierarchy of bodies from a certification authority. The certification authority certifies the certificates it issues. At each lower stage in the hierarchy, a valid certificate can only be issued if a body has been certified as able to issue certificates by a body at a higher level in the tree. Each certificate will identify the chain of certification from the certification authority down to the actual certificate.

A message including a certificate will be sent between parties as a signed message, the signing typically being effected using Public Key Encryption.

The obtaining and use of certificates can be summarized in, for example in the following.

In order to obtain a certificate, an originating party applies to a Certification Authority (CA) (or to another body certified directly or indirectly by the CA) for a digital certificate. The CA verifies the identity of the originating party and issues a certificate (assuming the originating party user checks as being OK). The CA also publishes the certificate by making it available in a public repository.

After the party has received the certificate, this can then be used in communications sent by the originating party. The use of the certificate can be summarized in the following steps:
1. The originating party digitally signs and sends an electronic message using the certificate to a recipient (often termed the relying party), who might be a merchant or a trading partner.
2. The relying party checks the originating party's certificate against the content of the public repository.
3. The repository checks, or validates, the originating party's certificate and responds to the relying party.
4. The relying party approves or declines service to the originating party based on the certificate validation results.

It can be seen that this approach provides a mechanism for verifying the identity of a user that is based on trust in the system. However, checking of the user's certificate with the repository requires a potential delay in acceptance of the message and typically there is a charge for checking the certificate with the repository.

An aim of the present invention is to provide for more efficient and cost effective certificate validation.

SUMMARY OF THE INVENTION

An aspect of the invention provides a certificate validation mechanism for a network interface. The certificate validation mechanism maintains a certificate cache that records certificates on which verification of validity has been performed along with an associated indication of validity resulting from the validity verification. It checks whether a received certificate is recorded in the certificate cache. Where a received certificate is recorded in the certificate cache, it associates with the received certificate an indication of validity retrieved from the certificate cache.

By providing a cache for certificates local to the network interface, the need always to verify a certificate by reference to the public repository is removed. As a result, more immediate verification of the certificate validity can be made locally without the cost and time of the remote verification at the public repository.

If a certificate is not held in the local cache, then it will still be necessary to query the public repository. In such a case therefore, the certificate validation mechanism requests verification of the validity of the certificate from a validation entity. It records the certificate along with an associated indication of validity derived from a validity verification result returned by the validation entity in the certificate cache. It associates an indication of validity with the received certificate.

The certificate could simply be received as is. However, it will typically be received with a message. In such a case the indication of validity can then be associated with the received message. The message referred to can, for example, be an e-mail message.

The certificate validation mechanism can be arranged to supply the message to a display engine with the associated certificate validity information. In this manner the user is able to confirm that the message has a valid certificate.

Alternatively, or in addition, the certificate validation mechanism can be arranged to supply summary information regarding one or more messages to a display engine for display of message summary information including certificate validity information. For example, the summary may be in the form of an in-box. With each received message displayed in the in-box, an indication can be given as to the validity, or otherwise, of that message.

In a preferred example the certificate validation mechanism supports multiple users, with a respective certification cache being maintained for each user. This can be important for reasons of security and respect for privacy.

A system certificate cache can be provided to hold certificates and associated validation indications for potential users. The certificate validation mechanism can be responsive to a user log on request to verify the validity of a certificate of a user by comparison to the system certificate cache.

Another aspect of the invention provides a network interface for interfacing at least one user to a network, the network interface providing a portal defining a user network environment and including a certificate validation mechanism as defined above. The network interface can further include an e-mail gateway, the portal being connected to receive e-mail messages via the e-mail gateway. The network interface can also include at least one web browser.

A portal provides a network environment for one or more users, for configuring an interface for the user(s) to the network, and also for configuring the local site as viewed from externally over the network.

A further aspect of the invention provides a program element including program code operable to provide a certificate validation mechanism or a network interface as defined above. The program element can be provided on a carrier medium.

Another aspect of the invention provides a computer system comprising memory, a processor and a certificate validation mechanism as defined above. The computer can form part of a computer network with the computer connected to at least one further computer via a network.

Yet a further aspect of the invention provides a method of validating a certificate associated with a message. The method includes maintaining a certificate cache containing certificates and associated validity indications. When a certificate is received, for example with a message, the certificate is compared to the content of the certificate cache. Where the certificate is held in the certificate cache, an indication of validity retrieved from the certificate cache is associated with the received certificate.

BRIEF DESCRIPTION OF THE DRAWINGS

Exemplary embodiments of the present invention will be described hereinafter, by way of example only, with reference to the accompanying drawings in which like reference signs relate to like elements and in which:

FIG. 5 is a schematic representation of a system cache;

FIG. 6 is a schematic representation of a user cache;

DESCRIPTION OF PARTICULAR EMBODIMENTS

Exemplary embodiments of the present invention are described in the following with reference to the accompanying drawings.

Figure 1:
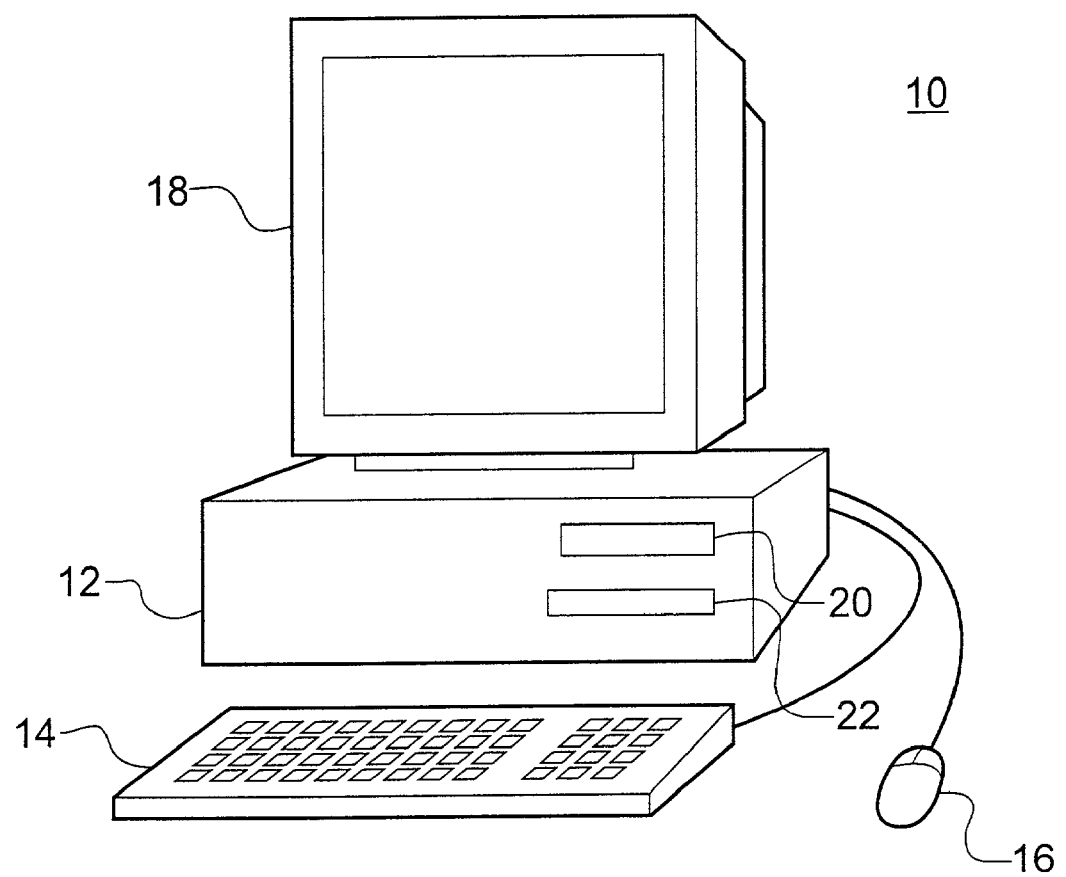
FIG. 1 is a schematic representation of a computer system.

FIG. 1 is a schematic representation of a computer workstation on which an exemplary embodiment of the invention is implemented. As shown in FIG. 1, a computer workstation 10 includes a system unit 12 that includes a processor, memory, etc (see FIG. 2), user input devices, for example in the form of a keyboard 14 and a pointing device (e.g., a mouse) 16, and a display 18. Removable media devices in the form, for example, of a floppy disk drive 20 and an optical and/or magneto-optical drive (e.g. a CD, a DVD ROM, a CDR drive) 22, can also be provided.

Figure 2:
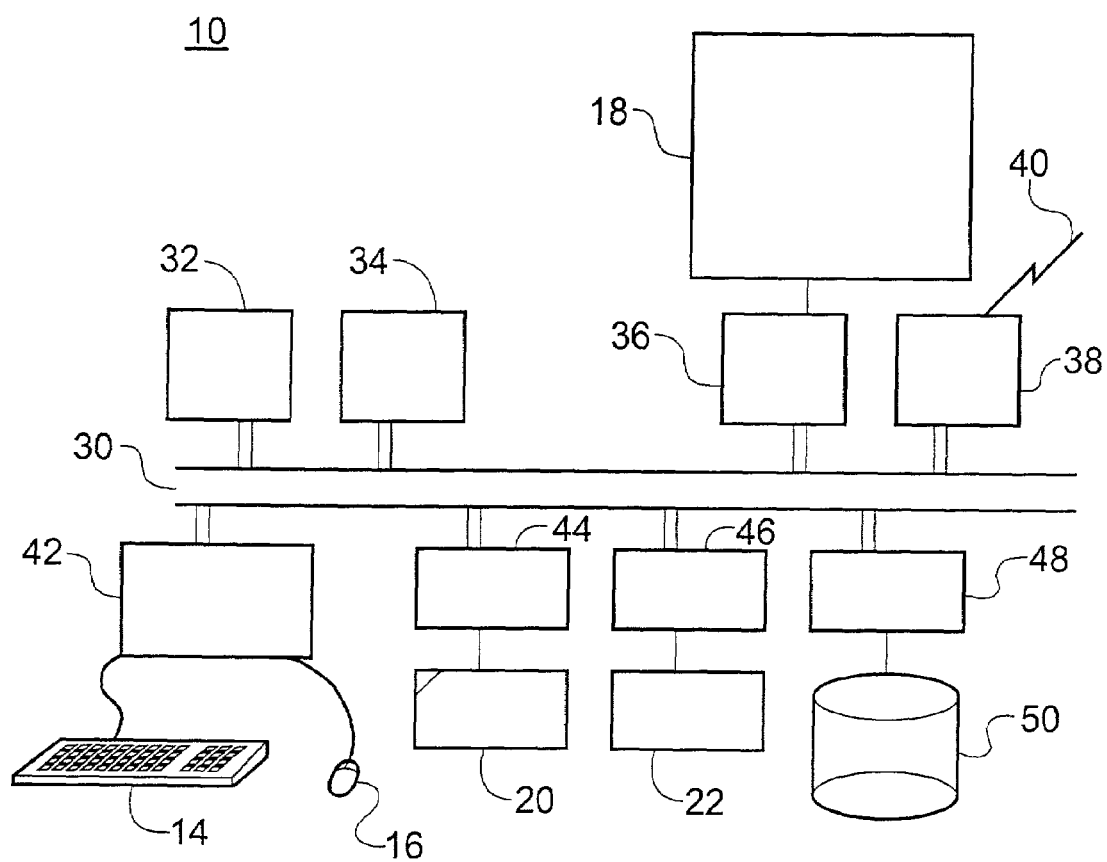
FIG. 2 is a schematic representation of a configuration of such a workstation.

FIG. 2 is schematic block diagram illustrating an exemplary configuration of a computer workstation 10 as shown in FIG. 1.

As shown in FIG. 2, the computer workstation 10 includes a bus 30 to which a number of units are connected. A microprocessor (CPU) 32 is connected to the bus 30. Main memory 34 for holding computer programs and data is also connected to the bus 30 and is accessible to the processor. A display adapter 36 connects the display 18 to the bus 30. A communications interface 38, for example a network interface and/or a telephonic interface such as a modem, ISDN or optical interface, enables the computer workstation 10 to be connected 40 to other computers via, for example, an intranet or the Internet. An input device interface 42 connects one or more input devices, for example the keyboard 14 and the mouse 16, to the bus 30. A floppy drive interface 44 provides access to the floppy disk drive 20. An optical drive interface 46 provides access to the optical or magneto-optical drive 22. A storage interface 48 enables access to a hard disk 50. Further interfaces, not shown, for example for connection of a printer (not shown), may also be provided. Indeed, it will be appreciated that one or more of the components illustrated in FIG. 2 may be omitted and/or additional components may be provided, as required for a particular implementation.

Figure 3A:
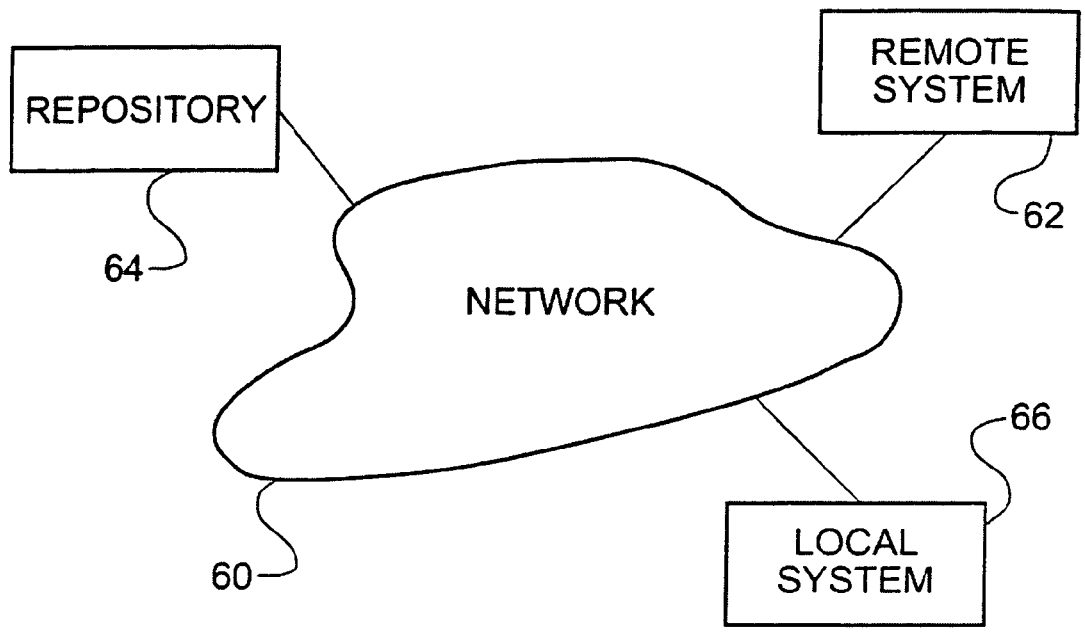
FIGS. 3A and 3B are schematic representations of a network environment including a local system.

FIG. 3A is an overview of a network 60, which could, for example, be the Internet, or could alternatively be an intranet or private network. As shown in FIG. 3A, a local system 66 incorporates an embodiment of the invention as will be described later. A remote system 62 is a computer station that is operable to send an e-mail message to the local system 66. It will be appreciated that in practice a typical network includes many more stations than are shown in FIG. 3A, FIG. 3A being merely a simplified diagram for explaining the background to the invention. Also shown in FIG. 3A is a repository 64, which provides a public source accessible by the users of the system for verifying certificates. Typically, there will be multiple repositories 64 connected to the network 60. In conventional operation, a local system 66 which desires verification of a certificate associated with an e-mail or other message received from, for example, the remote system 62 will need to send a message to the repository 64 in order to obtain verification of the validity of the certificate. Typically, this involves a delay, and also, this involves a charge being made by the operator of the repository 64. A charge may be raised for each interrogation of the repository 64 or there may be a charge based on expected usage levied as a standing charge.

An embodiment of the present invention seeks to reduce the delays that can occur from such a verification procedure, and also to reduce the charges that will be made.

Figure 3B:
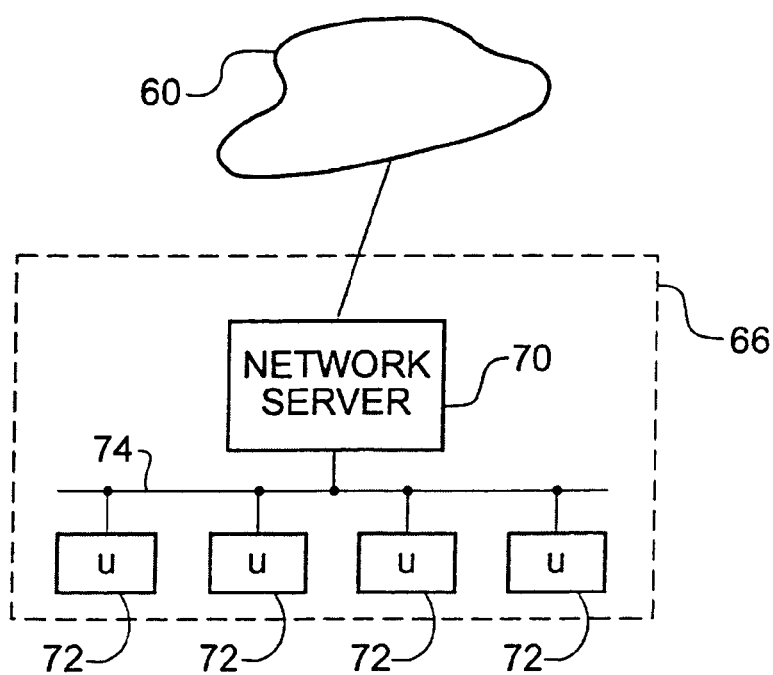

FIG. 3B illustrates a possible configuration of the local system 66. The local system 66 could be a single computer workstation such as the computer workstation illustrated with respect to FIGS. 1 and 2. Alternatively, it could be a local network 74 as shown in FIG. 3B that connects a network server 70 a plurality of user systems 72. In each case, the network server 70 and the user system 72 could be configured generally of the form shown in FIGS. 1 and 2, or could be configured using any other suitable computer configuration. For example, the network server could be a mainframe computer to which terminals are connected. It will be appreciated that the particular form of hardware used in the present instance could be varied according to the local configuration required for the local system 66.

Figure 4:
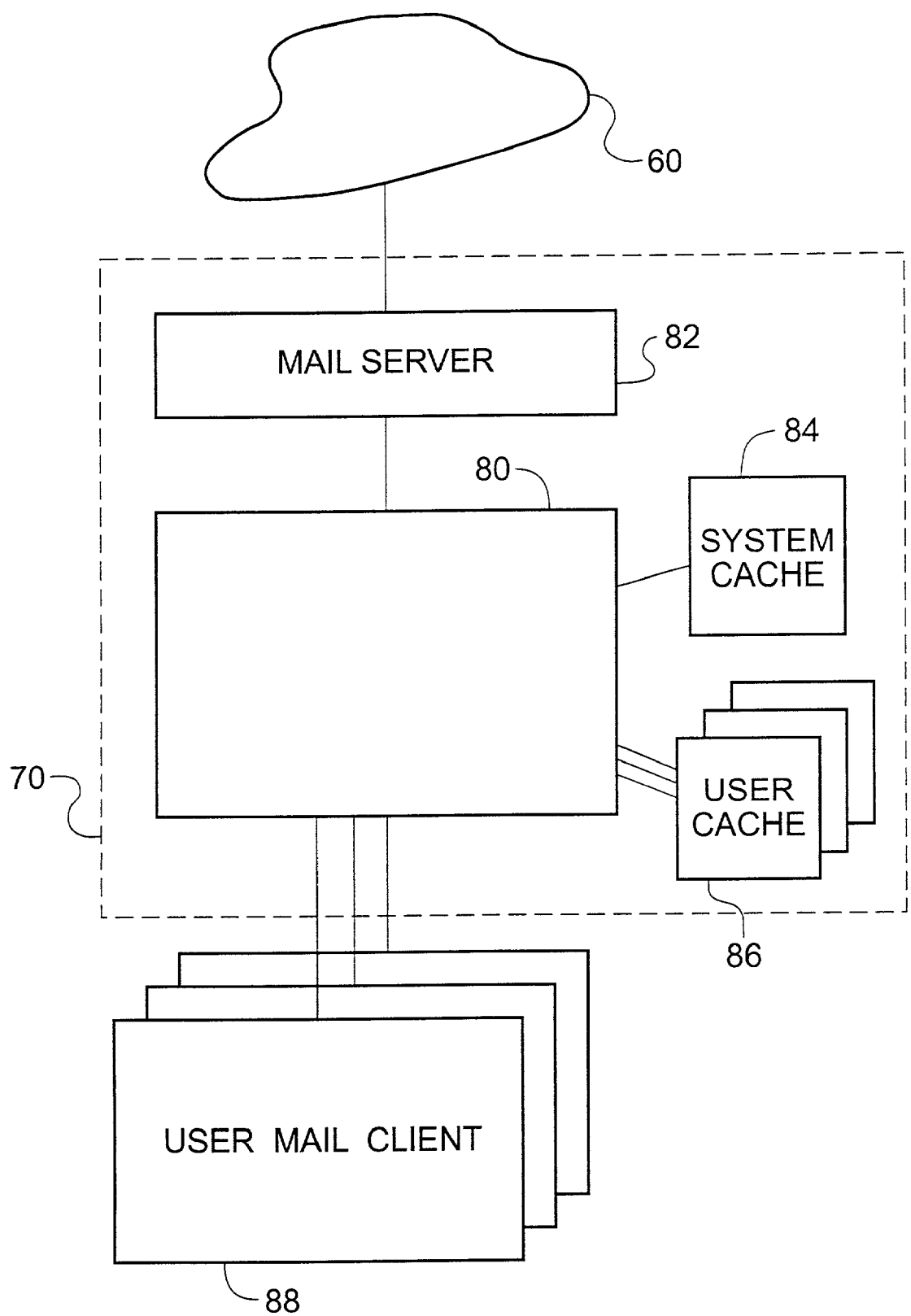
FIG. 4 is a schematic representation of the local system in more detail.

FIG. 4 illustrates the relationship of software components operating on the hardware of the local system 66. As illustrated in FIG. 4, a mail server 82 and a validation subsystem 80 are configured to operate on the hardware of the network server 70. The mail server 82 and the validation 80 can be formed by software components stored in memory of the network server 70 and operable to control the processor of the network server 70. Also shown in FIG. 4 are a system cache 84 and a user cache 86, which are software configurable files for storing information as will be described later. The system cache 84 and the user caches 86 could be held on the memory of the network server 70. In the present example, the system cache and the user cache are configured as directories using the Lightweight Directory Access Protocol (LDAP), although any other suitable protocol or format could be used.

The mail server 82 provides an interface to the network 60 for the receipt of messages from the network 60 and for the transmission of messages to the network 60. The messages can be e-mail messages or could be any other form of messages, depending on the implementation of the network and the communication protocol operating over the network 60.

The validation subsystem 80 interfaces with the mail server and is responsible for managing the system cache 84 and the user cache 86. The validation subsystem 80 further provides an interface to the user mail clients 88 shown in FIG. 4.

The validation subsystem 80 could be configured as part of a portal to provide a user configurable interface between the users and the network. An example of a portal called Portal Server is marketed by iPlanet, a Sun-Netscape Alliance. A portal provides a network environment for one or more users, for configuring an interface for the user(s) to the network and also for configuring the interface of the local system as viewed from externally over the network.

The user mail clients 88 are operable to process and display e-mail messages when received, and also to enable the user to prepare and send e-mail messages from the user stations 72. The user mail client could be a program product operable merely to provide the processing of e-mail messages, or could in addition or alternatively be a program product for providing an alternative messaging interface to the network 60. In the present instance, the user mail clients 88 are configured as web browsers on the user stations 72 illustrated in FIG. 3B. Accordingly, in this example the validation subsystem 80 is configured to communicate with the user mail client using a conventional HTML protocol or the like.

Although a particular distribution of the software components forming and configuring the mail server 82, the validation subsystem 80, the system cache 84, the user cache 86 and the user mail clients 88 has been described above, it will be appreciated that an alternative distribution of these components is also possible within a local system structure as shown in FIG. 3B or in accordance with an alternative local system structure, as appropriate.

FIG. 5 represents the content of the system cache 84. As shown in FIG. 5, the system cache 84 includes a separate entry for each user authorised to check the validity of certificates in received messages. The system cache 84 includes the user log-on identity (user ID), the certificate for that user, an indication of the validity of the certificate, and a date and/or time of validation of the certificate. The result of such a check of certificate status will typically be one of "valid", "revoked", or "unknown".

FIG. 6 illustrates an exemplary user cache 86. A separate user cache 86 is provided for each user identified in the system cache 84. There may be a one-to-one relationship between the user caches 86 and the user mail clients 88, or if multiple users are able to use one user mail client 88, there may be more user caches 86 than there are user mail clients 88.

As shown in FIG. 6, the user cache 86 includes, for certificates that have already been checked, the sender identity (sender ID) associated with the certificate, the certificate as extracted from a previously received message and as verified with the public repository, the result of verifying the validation with the repository, and the time and date of the validation of the certificate. The result of such a check of certificate status will typically be one of "valid", "revoked", or "unknown".

The operation of the system shown in FIG. 4 will now be described in the following with reference to FIGS. 7–9.

In step S1, the validation subsystem 80 is operable to receive a message from the mail server 82, which message has been received from the network 60. In step S2, the validation subsystem 80 is operable to extract a certificate from the received message, as well as the identity of the intended recipient.

In step S3, the validation subsystem is operable to compare the received certificate to certificates stored in the user cache 86 for the user concerned.

If, in step S4, it is determined that the certificate is stored in the appropriate user cache 86, then in step S5, the certificate validity information stored with the certificate in the user cache 86 is extracted and this is associated with the received message. The certificate status will typically be one of "valid", "revoked" or "unknown". The validity information extracted from the user cache 86 will typically be associated with the header information for the received message. The received message with the validity information is then forwarded in step S9 to the user mail client for display to the user.

If, alternatively, in step S4, it is determined that the certificate for the received message is not stored in the user cache 86 for the intended recipient, then in S6, the validation subsystem 80 is operable to send a message to the public repository 64 to verify the validity of the certificate. This can be achieved, for example, via portal services where the validation subsystem is part of a portal, or by another messaging system otherwise. The public repository 64 will, in due course, return an identification of the validity of the certificate using, for example, a protocol such as the Online Certificate Status Protocol (OCSP).

The result of such a check of certificate status will typically be one of "valid", "revoked", or "unknown". In step S7, on receipt of the certificate validity information, this is stored in the user cache 86 for the intended recipient in the format shown in FIG. 6.

In step S8, the received validity information is associated with the received message as described with respect to step S5 above. The received message with the validity information is then forwarded in step S9 to the user mail client 88 for display to the user.

Preferably, step S4 includes a check on the time since the certificate was last verified. If a predetermined time has elapsed, the certificate validity in the cache could be taken as unreliable and in this case the system could be operable to proceed as per steps S6–S8 rather than step S5. As an alternative, a separate process could be employed to purge, or remove, validation entries that are older than some predetermined time.

The time that a certificate can be assumed to be valid could vary from certificate to certificate, depending on the source of the certificate. Alternatively, or in addition, it could be could depend on other factors such as the value of a transaction to which a message relates. These are merely examples of possible factors. In each case, there is a trade-off between the cost and time for making a remote repository enquiry and the risk that a certificate has been revoked. Bearing this in mind, it is preferable that the cache records the time of the validation from the repository, rather that an expiry time, as the expiry time may vary from transaction to transaction, independent of the source of the certificate.

Also, each user may have different requirements, which is a reason why it is preferable to have separate local caches for each user.

The validation subsystem could be provided with a process that automatically updates at least selected certificate validations at intervals. Alternatively, or in addition, certificate validations could be updated in response to specific events. Consider, for example, receipt of an e-mail from a customer ordering goods. The certificate could be validated on receipt of the order. The certificate could then be validated again at a later stage immediately prior to dispatch at a time when the credit card account of the customer. The conditions under which validation updates are performed could be programmed under user control.

Figure 8A:
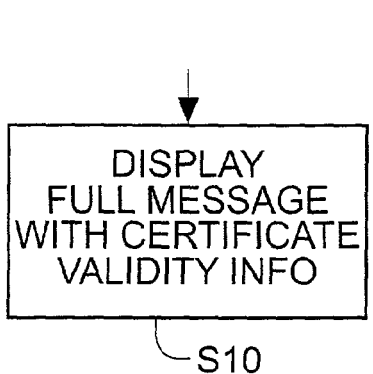
FIGS. 8A and 8B are flow diagrams illustrating further operational steps.
Figure 10:
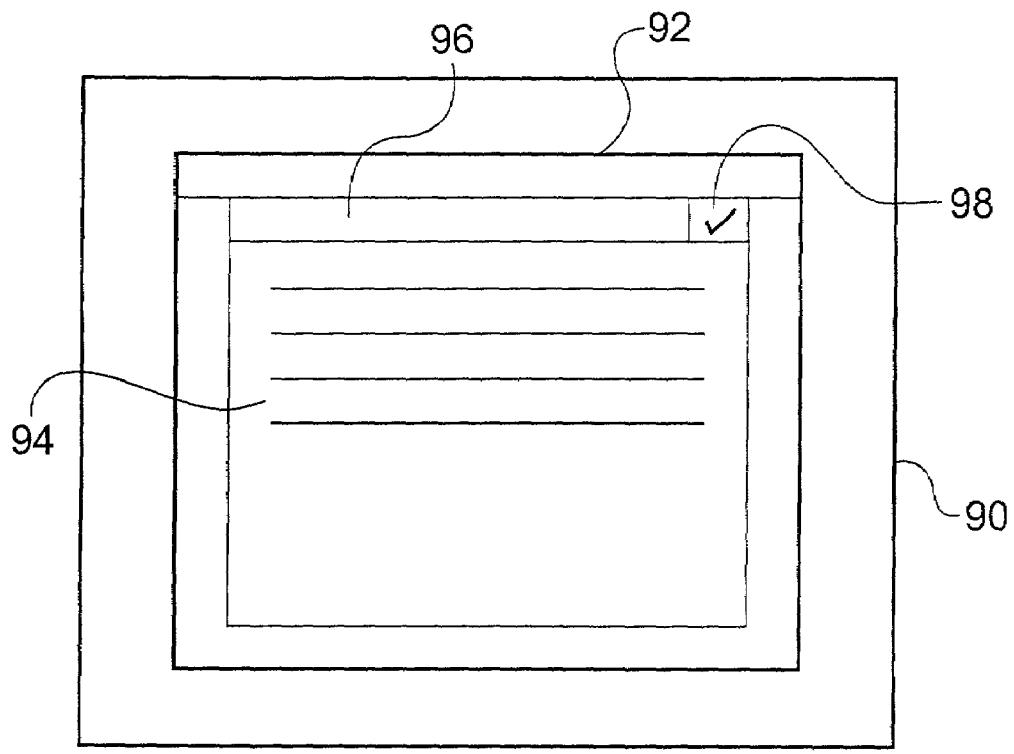
FIG. 10 is a schematic representation of an exemplary screen shot.

As shown in FIG. 8A, the user mail client can be operable to display a full message with certificate validity information. FIG. 10 is a schematic representation of the display of a message on a user display wherein, within the display field 90, a window 92 is displayed containing the e-mail message 94 and a header 96 that includes a validity status indication 98. As shown in FIG. 10, a tick is shown, which is assumed to indicate that the certificate is "valid".

Figure 7:
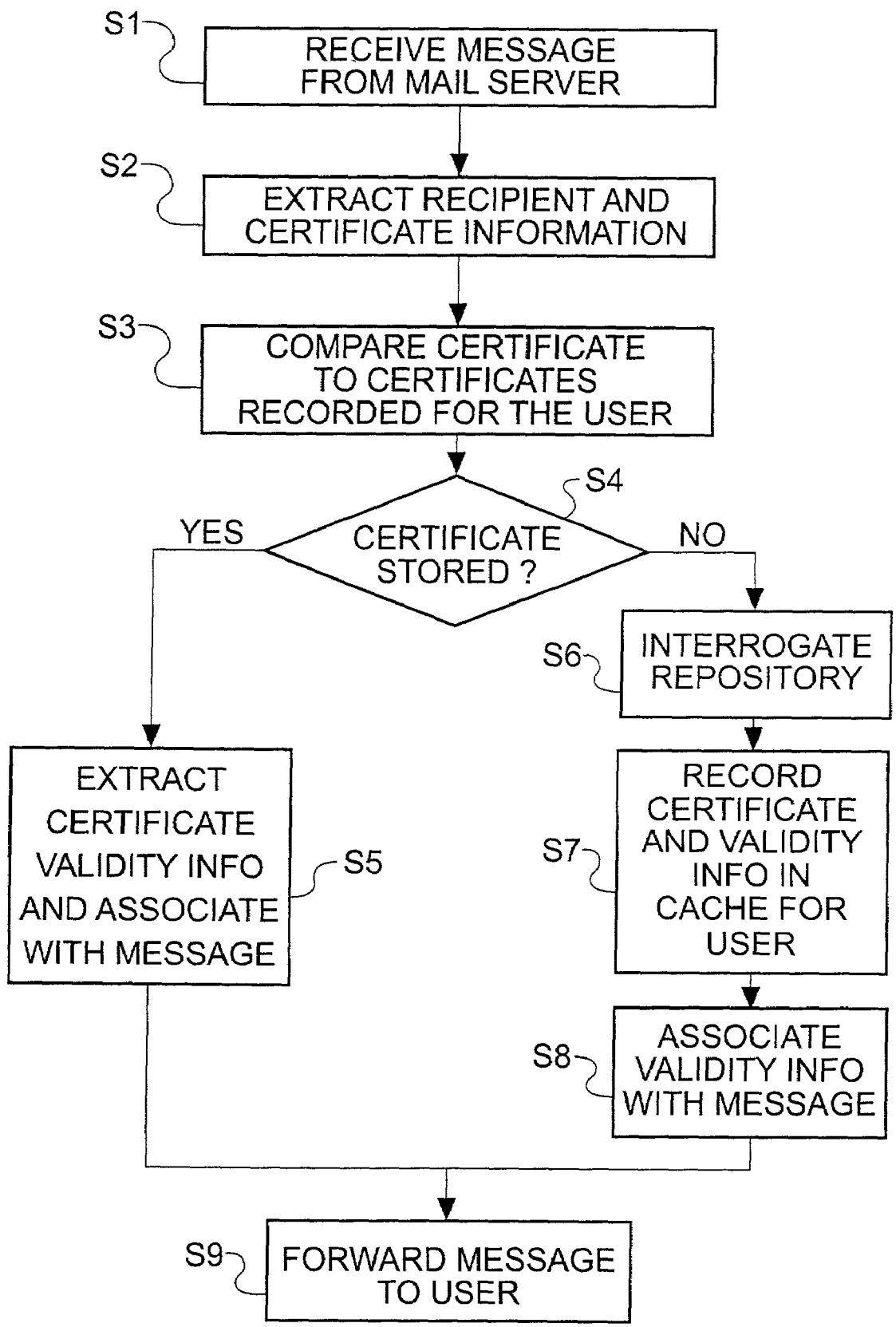
FIG. 7 is a flow diagram illustrating an example of operation of the local system in accordance with an embodiment of the invention.
Figure 8B:
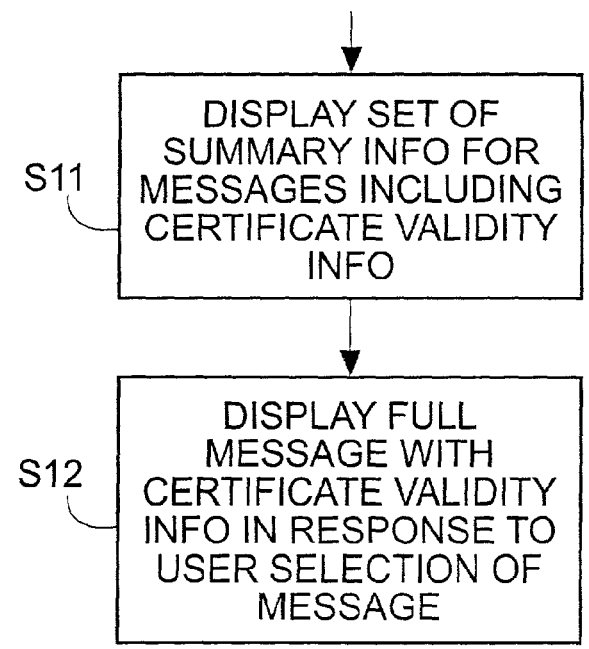

As an alternative to FIG. 8A, as shown in FIG. 8B, an initial step S11 could be to display a set of summary information for messages (for example in the form of an inbox showing summary information for each of a number of received messages), which summary information includes certificate validity information as associated with the message in step S5 or step S8 of FIG. 7.

Figure 11:
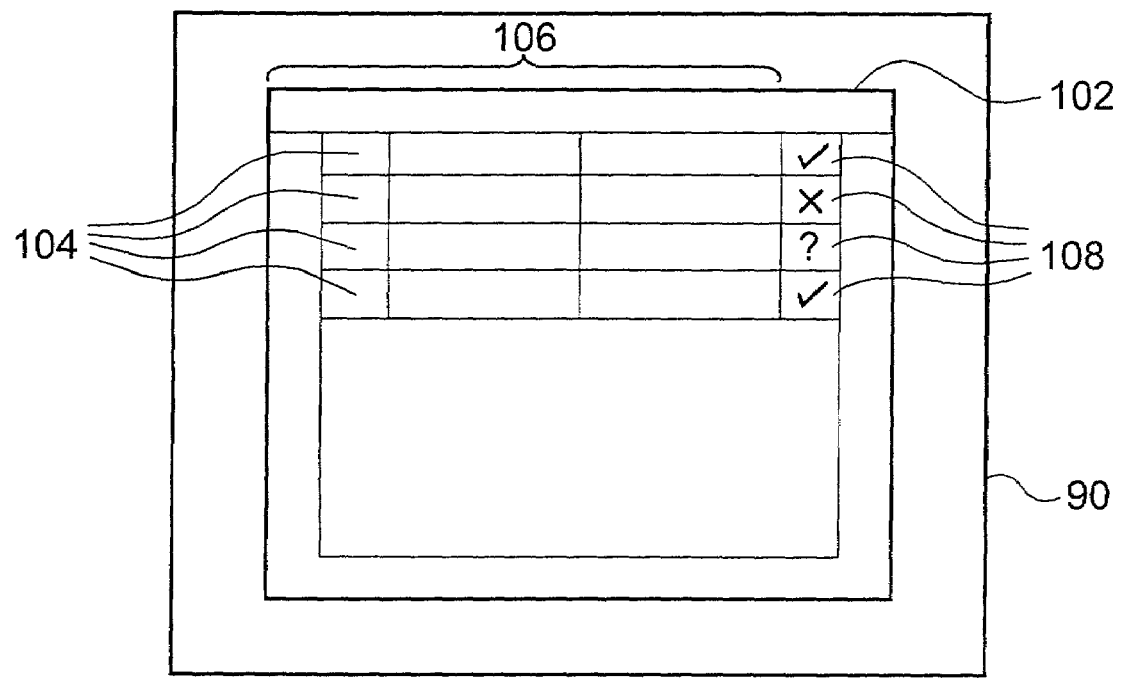
FIG. 11 is a schematic representation of a further exemplary screen shot.

FIG. 11 is a schematic representation of the display of such summary information, where, within a display field 90, a window 102 is displayed that shows, for each received message, a line of information 104, including conventional information 106 about the e-mail message, including the sender identification, a title, a time and date of sending, etc., and in addition validity information 108. As shown in FIG. 11, the validity information is either represented by a tick, a cross, or a question mark, where a tick represents "valid", a cross represents "revoked", and a question mark indicates "unknown".

In accordance with the typical operation of an in-box, the user could request a display of an e-mail message associated with the particular line of summary information by selecting the line of interest using a pointing device (e.g. a mouse). On clicking a button on the pointing device, the user mail client 88 can then be operable in step S12 to display the full message with the certificate validity information, for example, in the format illustrated in FIG. 10.

Figure 9:
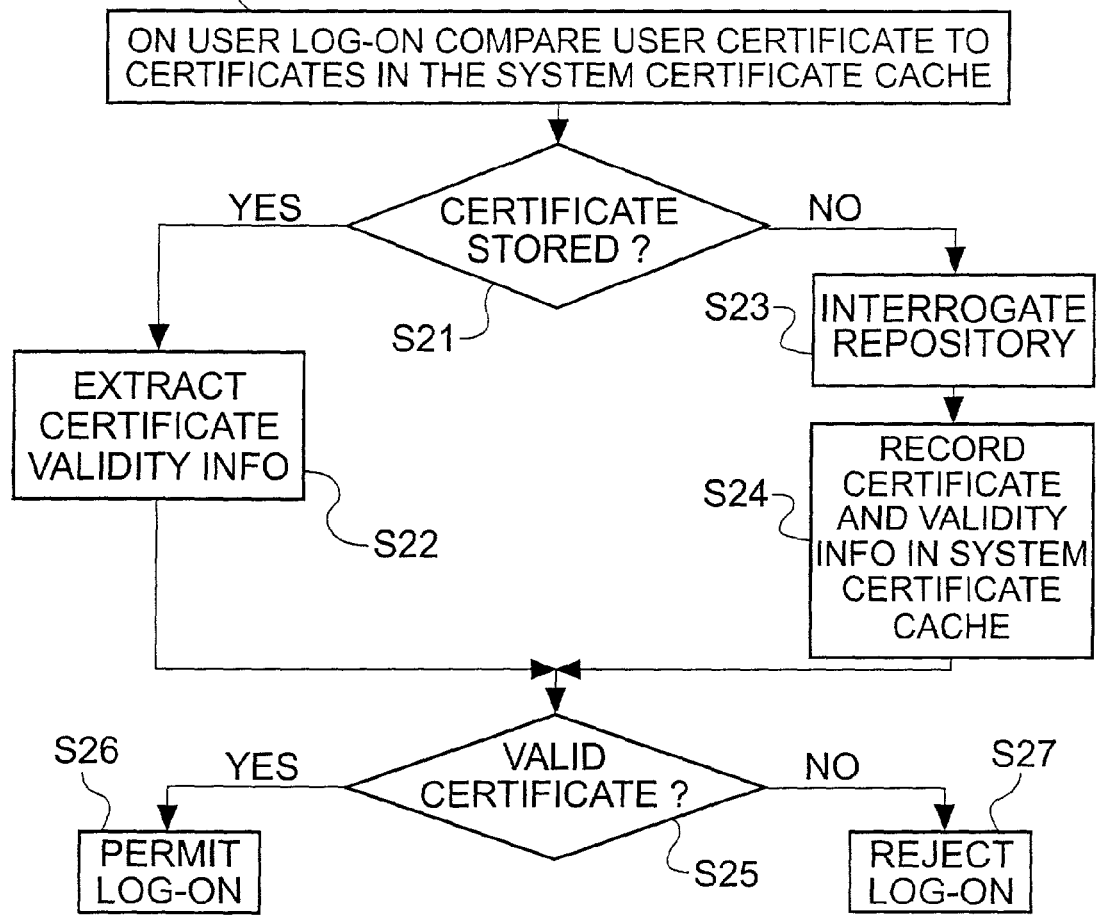
FIG. 9 is a flow diagram illustrating a further example of operation of the local system.

FIG. 9 is a flow diagram illustrating a user log-on procedure using the system cache 84. In this example of operation, a user log-on procedure can involve the user sending, from the user mail client, the user's own certificate to the validation subsystem 80.

In step S20, when a user attempts to log on, the validation subsystem 80 compares the user's certificate to the content of the system certificate cache.

If, in step S21, it is determined that the certificate is stored in the system certificate cache 84, then in step S22, the certificate validity information stored with the certificate in the user cache 86 is extracted. In a manner similar to step S4 of FIG. 7, step S22 preferably includes a check on the time since the certificate was last verified as discussed with reference to FIG. 7. The certificate status will typically be one of "valid", "revoked" or "unknown".

If, alternatively, in step S21, it is determined that the certificate for the received message is not stored in the system certificate cache 84, then in S23, the validation subsystem 80 is operable to send a message to the public repository 64 to verify the validity of the certificate. The public repository 64 will, in due course, return an identification of the validity of the certificate using, for example, a protocol such as the Online Certificate Status Protocol (OCSP).

Once again, the result of such a check of certificate status will typically be one of "valid", "revoked", or "unknown". In step S24, on receipt of the certificate validity information, this is stored in the system certificate cache 84 in the format shown in FIG. 5.

In step S25, if it is determined that the user certificate is deemed to be valid, then the user may be permitted to log-on at step S26. If, however, it is determined in step S25 that the certificate is unknown or revoked, then the validation subsystem can be operable to reject the log-on procedure of the user in step S27. In this manner, the user can be prevented from verifying certificate information if the user himself or herself is not authorised to perform such verification.

Thus, by employing the system cache 84 as described above, if the certificate is present in the system cache 84 and validation was effected within an appropriate time frame, the validation subsystem can verify the certificate without the need for a request to be sent to the public repository 64.

The mail server 82 as referenced in the above description can be a conventional mail server. Also, the user mail clients 88 can also be conventional user mail clients. The mail server 82, the portal server 80 and the user mail client 88 can all be provided as separate program products. Alternatively, the mail server 82 and the portal server 80 could be packaged as a single product. Similarly, that product could also be provided with the functionality of the user mail client. The or each program product could be implemented using program code for storage in the memory of a computing system and operable to control the processor of the computing system to provide the functionality identified above. Such program code could be provided on a carrier medium, for example, a storage medium (e.g. an optical, magneto-optical or magnetic storage medium) or a transmission medium (for example, a telephone line, a carrier wave signal, etc.). As an alternative to the provision of software on a carrier medium, the functionality of the present invention could be incorporated in special-purpose hardware, using, for example, an application specific integrated circuit (ASIC).

Thus, there has been described a certificate validation mechanism is provided for a network interface. The certificate validation mechanism maintains a certificate cache containing local copies of certificates with associated validity indications. The certificate validation mechanism is operable to compare a certificate associated with a received message to the certificate cache and, where the certificate associated with the received message is held in the certificate cache, to associate with the message an indication of validity retrieved from the certificate cache. By providing a cache for certificates local to the network interface, the need always to verify a certificate by reference to a public repository is removed. If a certificate is not held in the local cache, then it can still be necessary to query the public repository. Nevertheless, the verification mechanism provides more immediate verification of certificate validity as this can be made locally without the cost and time of the remote verification at the public repository. The verification mechanism can form part of portal for a network interface.

Although particular embodiments of the invention have been described, it will be appreciated that many modifications/additions and/or substitutions may be made within the spirit and scope of the invention as defined in the appended claims.

For example, rather than a field indicating a date and time of a certificate validation in the local cache, an expiry time for the information in the cache could be specified.

What is claimed is:

1. A system comprising:
   a certificate validation mechanism;
   a system cache; and
   one or more user caches including a first user cache;
   wherein the certificate validation mechanism is configured to:
   store a user entry in the system cache for a first user authorized to receive messages containing certificates, wherein the user entry includes a certificate for the first user;
   store a sender entry in the first user cache including a certificate previously received in a message directed at the first user; and,
   on receiving a new message directed at the first user, if a new certificate extracted from the new message matches a certificate present in the first user cache, send validity information for the new certificate to a first user application from the first user cache.

2. The system as recited in claim 1, wherein, prior to sending the validity information, the certificate validation mechanism is further configured to verify that a specified condition has been met.

3. The system as recited in claim 2, wherein the specified condition is a function of a value of a transaction associated with the new message.

4. The system as recited in claim 2, wherein the specified condition is a function of a source of the new message.

5. The system as recited in claim 2, wherein the specified condition is a function of a requirement associated with the first user.

6. The system as recited in claim 1, wherein at least one cache of the system cache and the first user cache is configured as a directory using the Lightweight Directory Access Protocol (LDAP).

7. The system as recited in claim 1, wherein, if a match for the new is not found in the first user cache, the certificate validation mechanism is configured to send a verification message to a repository to verify the validity of the new certificate.

8. The system as recited in claim 7, wherein the certificate validation mechanism is further configured to store contents of a response to the verification message received from the repository in the first user cache.

9. A method comprising:
   storing a user entry in a system cache for a first user authorized to receive messages containing certificates, wherein the user entry includes a certificate for the first user;
   storing a sender entry in a first user cache of one or more user caches, including a certificate previously received in a message directed at the first user; and
   on receiving a new message directed at the first user, if a new certificate extracted from the new message matches a certificate present in the first user cache, sending validity information for the new certificate to a first user application from the first user cache.

10. The method as recited in claim 9, further comprising: verifying that a specified condition has been met prior to sending the validity information.

11. The method as recited in claim 10, wherein the specified condition is a function of a value of a transaction associated with the new message.

12. The method as recited in claim 9, wherein at least one cache of the system cache and the first user cache is configured as a directory using the Lightweight Directory Access Protocol (LDAP).

13. The method as recited in claim 9, further comprising: sending a verification message to a repository to verify the validity of the new certificate if a match for the new certificate is not found in the first user cache.

14. The method as recited in claim 13, further comprising: storing contents of a response to the verification message received from the repository in the first user cache.

15. A computer readable medium comprising program instructions, wherein the instructions are computer executable to:
   store a user entry in a system cache for a first user authorized to receive messages containing certificates, wherein the user entry includes a certificate for the first user;
   store a sender entry in a first user cache of one or more user caches, including a certificate previously received in a message directed at the first user; and
   on receiving a new message directed at the first user, if a new certificate extracted from the new message matches a certificate present in the first user cache, send validity information for the new certificate to a first user application from the first user cache.

16. The computer readable medium as recited in claim 15, wherein the instructions are further executable to:
   verify that a specified condition has been met prior to sending the validity information.

17. The computer readable medium as recited in claim 16, wherein the specified condition is a function of a value of a transaction associated with the new message.

18. The computer readable medium as recited in claim 15, wherein the instructions are further executable to:
   send a verification message to a repository to verify the validity of the new certificate if a match for the new certificate is not found in the first user cache, and to store contents of a response to the verification message received from the repository in the first user cache.

19. A certificate validation mechanism operable to:
   maintain a system cache and one or more user caches including a first user cache;
   store a user entry in the system cache for a first user authorized to receive messages containing certificates, wherein the user entry includes a certificate for the first user;
   store a sender entry in the first user cache including a certificate previously received in a message directed at the first user; and,
   on receiving a new message directed at the first user, if a new certificate extracted from the new message matches a certificate present in the first user cache, send validity information for the new certificate to a first user application from the first user cache.

20. A network interface allowing at least a first user to access a network, the network interface providing a portal defining a user network environment and including a certificate validation mechanism configured to:
   maintain a system cache and one or more user caches including a first user cache;
   store a user entry in the system cache for the first user including a certificate for the first user;

store a sender entry in the first user cache including a certificate previously received in a message directed at the first user; and, on receiving a new message directed at the first user, if a new certificate extracted from the new message matches a certificate present in the first user cache, send validity information for the new certificate to a first user application from the first user cache.

21. A computer network comprising at least one computer system connected to at least one further computer system via a network, the computer system comprising memory, a processor and a certificate validation mechanism configured to:

maintain a system cache and one or more user caches including a first user cache;

store a user entry in the system cache for a first user authorized to receive messages containing certificates, wherein the user entry includes a certificate for the first user;

store a sender entry in the first user cache including a certificate previously received in a message directed at the first user; and, on receiving a new message directed at the first user, if a new certificate extracted from the new message matches a certificate present in the first user cache, send validity information for the new certificate to a first user application from the first user cache.

22. A computer network comprising at least one computer system connected to at least one further computer system via a network, the computer system comprising a network interface including a certificate validation mechanism configured to:

maintain a system cache and one or more user caches including a first user cache;

store a user entry in the system cache for a first user authorized to receive messages containing certificates, wherein the user entry includes a certificate for the first user;

store a sender entry in the first user cache including a certificate previously received in a message directed at the first user; and, on receiving a new message directed at the first user, if a new certificate extracted from the new message matches a certificate present in the first user cache, send validity information for the new certificate to a first user application from the first user cache.

* * * * *